US009626271B2

(12) United States Patent
Karpuram et al.

(10) Patent No.: US 9,626,271 B2
(45) Date of Patent: Apr. 18, 2017

(54) MULTIVARIATE METADATA BASED CLOUD DEPLOYMENT MONITORING FOR LIFECYCLE OPERATIONS

(71) Applicant: Oracle International Corporation, Redwood Shores, CA (US)

(72) Inventors: Venkata Ramana Karpuram, Fremont, CA (US); Praneeth Kumar Naramsetti, Bangalore (IN); Thyagaraju Poola, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/725,442

(22) Filed: May 29, 2015

(65) Prior Publication Data

US 2016/0350102 A1    Dec. 1, 2016

(51) Int. Cl.
| | |
|---|---|
| G06F 9/44 | (2006.01) |
| G06F 11/34 | (2006.01) |
| G06F 9/445 | (2006.01) |
| G06F 11/36 | (2006.01) |

(52) U.S. Cl.
CPC .............. *G06F 11/34* (2013.01); *G06F 8/665* (2013.01); *G06F 11/3428* (2013.01); *G06F 11/3604* (2013.01); *G06F 8/65* (2013.01)

(58) Field of Classification Search
CPC .......... G06F 8/60–8/78; G06F 11/30–11/3696
See application file for complete search history.

(56) References Cited

U.S. PATENT DOCUMENTS

| | | | | | |
|---|---|---|---|---|---|
| 8,677,327 | B2* | 3/2014 | Huang | ................ | G06F 11/3696 703/27 |
| 8,914,783 | B2* | 12/2014 | Van Camp | ................ | G06F 8/65 717/168 |
| 2006/0129992 | A1* | 6/2006 | Oberholtzer | ........ | G06F 11/3428 717/124 |
| 2009/0007073 | A1* | 1/2009 | Huang | ................ | G06F 11/3696 717/124 |

(Continued)

OTHER PUBLICATIONS

Ferry, Nicholas, et al., "Towards model-driven provisioning, deployment, monitoring, and adaptation of multi-cloud systems", 2013, pp. 887-894.*

(Continued)

*Primary Examiner* — Thuy Dao
*Assistant Examiner* — Christopher Franco
(74) *Attorney, Agent, or Firm* — Invoke (57) ABSTRACT

Techniques are described for metadata-based monitoring of lifecycle operations on software deployments. In one embodiment, a set of metadata is stored in volatile or non-volatile store. The set of metadata may include a plurality of signatures and map a first signature of the plurality of signatures to a first status identifier for a first benchmark of a particular operation. A first set of log data that is associated with one or more software deployments is monitored for occurrence of the first signature. Based, at least in part, on the monitoring, a status of the first benchmark with respect to the first set of one or more software deployments is determined. Report data that indicates the status of the first benchmark is then generated and displayed.

18 Claims, 6 Drawing Sheets

(56) References Cited

U.S. PATENT DOCUMENTS

| | | | |
|---|---|---|---|
| 2009/0043786 A1* | 2/2009 | Schmidt | G06F 17/30038 |
| 2009/0319783 A1* | 12/2009 | Thornton | H04L 63/0823 |
| | | | 713/156 |
| 2010/0042659 A1* | 2/2010 | Rose | G06F 8/36 |
| | | | 717/174 |
| 2011/0314138 A1* | 12/2011 | Kobayashi | G06F 11/3476 |
| | | | 709/222 |
| 2013/0067461 A1* | 3/2013 | Taragin | G06F 8/61 |
| | | | 717/176 |
| 2013/0145348 A1* | 6/2013 | Agovic | G06F 17/3056 |
| | | | 717/120 |
| 2014/0244581 A1* | 8/2014 | Rath | G06F 17/30575 |
| | | | 707/623 |
| 2014/0278326 A1* | 9/2014 | Sharma | G06F 8/60 |
| | | | 703/13 |
| 2014/0279941 A1* | 9/2014 | Atkisson | G06F 17/30371 |
| | | | 707/690 |

OTHER PUBLICATIONS

Povedano-Molina, Javier, et al., "DARGOS: A highly adaptable and scalable monitoring architecture for multi-tenant Clouds", 2013, pp. 2041-2056.*

Juve, Gideon, et al., "Automating Application Deployment in Infrastructure Clouds", 2011, pp. 658-665.*

Konig, B., et al., "Elastic monitoring framework for cloud infrastructures", 2011, pp. 1306-1315.*

Ward, Jonathan Stuart, et al., "Self Managing Monitoring for Highly Elastic Large Scale Cloud Deployments", 2014, pp. 3-10.*

Papaioannou, Antonis, et al., "An Architecture for Evaluating Distributed Application Deployments in Multi-Clouds", 2013, pp. 547-554.*

* cited by examiner

| Row ID | Metadata (#DEPLOYMENT, LIFECYCLEOPERATION, RELEASE, FILELOCATION, TASK, SIGNATURE, STATUS) |
|---|---|
| 302 | FA_HCM,UPGRADE, 11.1.9.0.0, /fsnadmin/upgrade/11.1.9.0.0_ST1/11.1.9.0.0/ruplitesaas/output/logs/*/ruplitesaasautocorrect-root.log,Bootstrap-Root, RUPLite for SAAS Bootstrapping (autocorrect-root) Started, Started |
| 304 | FA_HCM,UPGRADE, 11.1.9.0.0, /fsnadmin/upgrade/11.1.9.0.0_ST1/11.1.9.0.0/ruplitesaas/output/logs/*/ruplitesaasautocorrect-root.log, Bootstrap-Root, RUPLite for SAAS Bootstrapping (autocorrect-root) Completed, Success |
| 306 | FA_HCM,UPGRADE,11.1.9.0.0, /fsnadmin/upgrade/11.1.9.0.0_ST1/11.1.9.0.0/ruplitesaas/output/logs/*/ruplitesaasautocorrect-root.log, Bootstrap-Root, RUPLite for SAAS Bootstrapping (autocorrect-root) Completed with failures, Failed |

| Tenant | Software Type | Release | Benchmark 502 | Benchmark 504 | Benchmark 506 | Benchmark 508 |
|---|---|---|---|---|---|---|
| Tenant 512 | ERP | 11.1.8.0.0 | Success (2015-04-09 18:45:48) | Skipped (2015-06-13 13:35:52) | Success (2015-06-13 14:44:25) | Success (2015-06-14 06:14:49) |
| Tenant 512 | ERP | 11.1.7.0.0 | Success (2015-03-22 22:38:52) | Success (2015-03-24 05:51:34) | Success (2015-03-24 09:23:31) | Failed (2015-03-24 19:38:22) |
| Tenant 514 | HCM | 11.1.9.1.0 | Failed (2015-03-19 20:12:14) | Success (2015-03-21 08:30:48) | | Success (2015-03-22 03:11:37) |
| Tenant 514 | CRM | 11.1.8.0.0 | Success (2015-04-01 10:18:22) | | Started (2015-04-24 21:50:14) | |
| Tenant 514 | GSI | 11.1.9.1.0 | Success (2015-04-14 18:48:36) | Success (2015-04-15 02:58:02) | Success (2015-04-15 17:32:29) | |
| Tenant 516 | HCM | 11.1.9.0.0 | Success (2015-05-25 12:21:25) | Success (2015-06-12 11:34:44) | Success (2015-06-13 08:21:06) | Started (2015-06-13 15:57:41) |

MULTIVARIATE METADATA BASED CLOUD DEPLOYMENT MONITORING FOR LIFECYCLE OPERATIONS

CROSS-REFERENCE TO RELATED APPLICATIONS

This application is related to Provisional Appln. 62/056,073, filed Sep. 26, 2014, entitled "Method and System for Implementing Efficient Classification and Exploration of Data", the entire contents for each of which is hereby incorporated by reference as if fully set forth herein.

TECHNICAL FIELD

The present disclosure relates, generally, to techniques for managing lifecycle operations and, more specifically, to a computer-implemented, metadata-based approach for monitoring and reporting status information for lifecycle operations across one or more software deployments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Administrators are often responsible for performing various lifecycle operations such as patching, upgrade, and cloning of complex software deployments. Over the course of a lifecycle operation, an administrator may run a set of tasks or commands, one after another, until the operation is complete. In order to avoid mistakes that could negatively impact performance or require significant time to correct, administrators tend to perform one lifecycle operation at a time and to continuously monitor the progress of the operation. Some lifecycle operations take several hours or even days to complete. In some cases, an administrator may spread a lifecycle operation across multiple work shifts until the operation is complete.

Concerns over lifecycle management scalability generally do not arise in on-premise, datacenter environments that have low deployment-to-administrator ratios. As an example, some datacenter environments have a one-to-one deployment-to-administrator ratio, where an administrator handles a single deployment at a time. In such environments, an administrator may manually perform the lifecycle operation and monitor its progress in front of a computer console until the operation is complete without worrying about other deployments. As the number of deployments per administrator increases, however, this approach does not scale well, and lifecycle operations may become backlogged until the administrators have time to work on them.

In cloud deployments, each administrator may be responsible for dozens or hundreds of service deployments. With such a high deployment-to-administrator ratio, it is not scalable for administrators to perform and continuously monitor one lifecycle operation at a time. Therefore, administrators generally perform multiple lifecycle operations in parallel when responsible for managing a large number of deployments. However, switching between multiple lifecycle operations for various deployments may be a tedious and error-prone process. Delays and errors in performing lifecycle operations may negatively impact delivery schedule and increase costs for service deployments.

One approach administrators may use to help manage various deployments is to write each complex lifecycle operation into one large script that sends emails during and after each of the sub-tasks in the lifecycle operation. When these scripts are invoked, emails are sent notifying the administrator of completion of the sub-tasks as well as anomalies that may have been encountered. Administrators may thus scan through the emails on a routine basis to monitor the lifecycle operation's progress. This approach may help keep an administrator apprised of current progress of various lifecycle operations. However, administrators may not be able to handle the volume of emails as dozens or hundreds of service deployments go through lifecycle operations at the same time. As the deployment-to-administrator ratio increases, the number of emails generated by the scripts per hour may be greater than the processing bandwidth of an administrator.

Another approach administrators may use to help monitor the progress of a lifecycle operation is to install custom software. According to this approach, the administrator writes custom software to monitor and report on the progress of a lifecycle operation. This approach may be time-consuming and cumbersome, as it involves the administrator writing new custom code each time a new lifecycle operation is created or a new version of the software is deployed.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

In various embodiments, computer systems, stored instructions, and technical steps are described for monitoring lifecycle operations within software systems. Various embodiments provide a flexible and customizable metadata-based approach through which lifecycle operations may be monitored and managed. The metadata-based approach described herein may accommodate new lifecycle operations with little to no change in the underlying logic for monitoring an operation's progress. Rather than writing complex code, an administrator or other user may define custom metadata objects to guide the monitoring process. The metadata-based approach may also provide a highly scalable solution to lifecycle monitoring in cloud deployment environments where a large number of services are managed by a relatively small number of administrators. The monitoring and reporting of lifecycle operations may be tailored in such a way as to streamline their performance and facilitate processing of benchmark events.

According to one embodiment, monitoring metadata is maintained by a lifecycle management system. The monitoring metadata that is maintained may generally comprise a set of signatures that may be used to track and report the progress of a lifecycle operation. The metadata may further comprise a signature-to-status mapping that maps a respective signature from the set of signatures to a status of a benchmark of the lifecycle operation. During runtime, the lifecycle management system may read a respective signature from the metadata and monitor a set of log files associated with one or more software deployments for an occurrence of the signature. Based on such monitoring, the lifecycle management system may determine the status of an operation benchmark with respect to one or more software deployments. The lifecycle management system may further generate and cause report data to be displayed, where the report data indicates the status of the benchmark of the particular operation with respect to the one or more software deployments.

According to another embodiment, the lifecycle management system maintains report metadata that indicates how to generate and present report data. For example, the report metadata may define which operation benchmarks to display and an order in which they are displayed. During runtime, the lifecycle management system may process signature matches for the benchmarks defined in the report metadata and display the status of the benchmarks in the indicated order. The administrator may specify one or more filter criteria to further select and refine which benchmarks are displayed.

Figure 1:
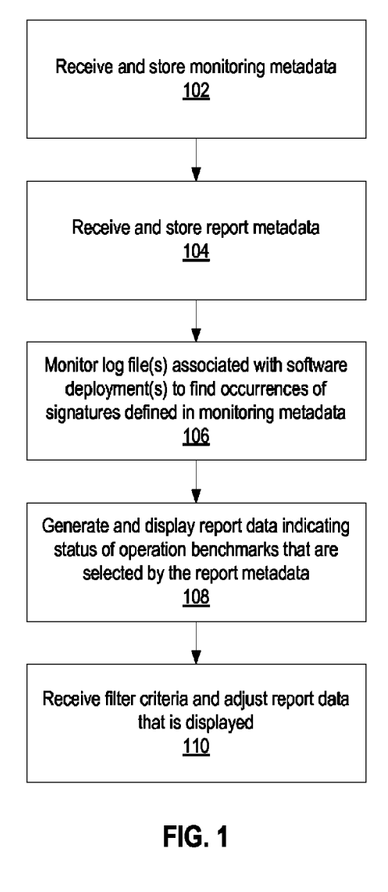
FIG. 1 illustrates an example process for metadata-based monitoring and reporting of the progress of a lifecycle operation.

FIG. 1 illustrates an example process for metadata-based monitoring and reporting of the progress of a lifecycle operation. At step 102, the lifecycle management system receives and stores monitoring metadata. At step 104, the lifecycle management system receives and stores report metadata. At step 106, the lifecycle management system monitors log files that are associated with a set of one or more software deployments to find occurrences of signatures defined in the monitoring metadata. At step 108, the lifecycle management system generates and displays report data indicating the status of operation benchmarks that are selected by the report metadata. At step 110, the lifecycle management system receives filter criteria and adjusts the report data that is displayed in accordance with the filter criteria.

Lifecycle Management System

Figure 2:
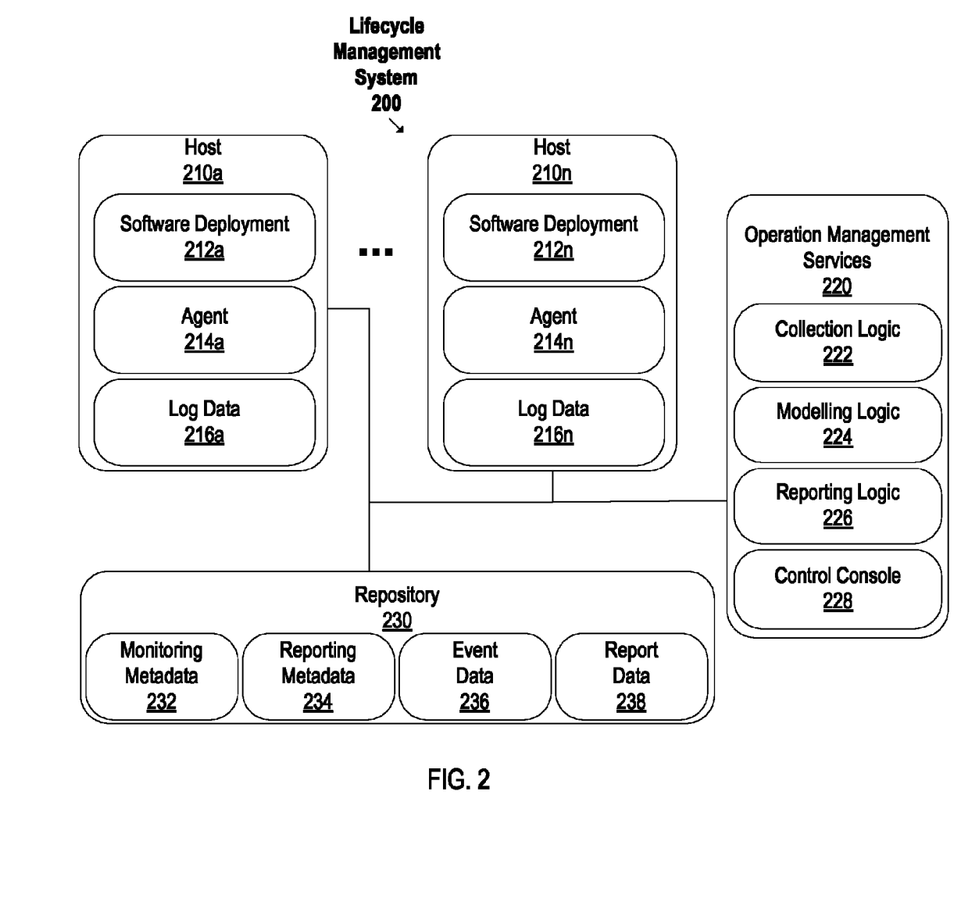
FIG. 2 illustrates an example system for managing lifecycle operations across several software deployments.

FIG. 2 illustrates an example system for managing lifecycle operations across several software deployments. Lifecycle management system 200 generally comprises hosts 210a to 210n, operation management services 220, and repository 230. Components of lifecycle management system 200 may be implemented in one or more datacenters, one or more clouds, and/or one or more other networked environments.

Hosts 210a to 210n represent a set of one or more network hosts and generally comprise software deployments 212a to 212n, agents 214a to 214n, and log data 216a to 216n. Hosts 210a to 210n are communicatively coupled with operation management services 220 and may send/receive messages according to one or more communication protocols. Example communication protocols that may be implemented include, without limitation, the hypertext transfer protocol (HTTP), secure shell (SSH), and/or other communication protocols of the internet protocol suite.

A "software deployment" in this context refers to an instance of a particular software application or set of inter-related software applications that are jointly managed. Example software deployments may include, without limitation, an instance of a database management system, middleware applications, customer relationship management systems (CRMs), operating systems, enterprise resource planning (ERP) systems, and application software. A software deployment may be an instance of a standalone software product/package or an instance of software that is delivered as part of a service offering in a cloud deployment model. A deployment that is part of a cloud offering is also referred to herein as a "service instance". Example cloud deployment models for a service instance may include, without limitation, software-as-a-service (SaaS), infrastructure-as-a-service (IaaS), database-as-a-service (DBaaS), and platform-as-a-service (PaaS).

Agents 214a to 214n periodically or continuously send data, collected from software deployments 212a to 212n, to operation management services 220. The data collected by agents 214a to 214n may generally comprise data that identifies attributes of the corresponding software deployment and the status of a lifecycle operation, if any, that is being performed for the software deployment. As an example, agents 214a to 214n may collect and send data that may include or otherwise identify, without limitation, one or more of the following attributes:

A start time for a sub-task of a lifecycle operation;
A completion time for a sub-task of a lifecycle operation; and/or
A status of for a sub-task of the lifecycle operation.

Each agent may be implemented as a set of one or more processes, such as a service or daemon, that executes on the corresponding host machine and monitors a corresponding software deployment. The agents may be components of a management system such as a network management system (NMS) or enterprise management system (EMS).

Although only one software deployment and one agent are illustrated per host, the number of software deployments, agents, and log files per host may vary from implementation to implementation. For example, multiple deployments, agents, and/or log files may be provisioned on a single host. Furthermore, in a clustered environment, a single software deployment may logically be spread across a plurality of hosts. As an example, a deployment may comprise a cloud database, with multiple sub-target database nodes spanning more than one compute node, with each database node running a database server.

Operation management services 220 generally comprise collection logic 222, modelling logic 224, reporting logic 226, and control console 228. Each of these logic units is configured to perform a distinct set of functions with respect to managing lifecycle operations performed for software deployments 212a to 212n. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Collection logic 222 is configured to collect or otherwise receive data from agents 214a to 214n and to store the collected data in repository 230. Collection logic 222 may collect data on a continuous or periodic basis, depending on the particular implementation. As an example, one or more of agents 214a to 214n may send collected data to collection logic 222 in response to detecting occurrence of an event. As another example, one or more of agents 214a to 214n may send collected data every few minutes or on some other periodic basis.

Modelling logic 224 provides interfaces and logic for generating and saving meta-models for monitoring and reporting. For example, modelling logic 224 may allow a user to create monitoring meta-models and/or reporting meta-models, as described in further detail below. Modelling logic 224 may store the meta-models in repository 230 and/or distribute the meta-models to hosts 210a to 210n.

Reporting logic 226 generates and causes display of report data in accordance with the reporting meta-models. Reporting logic 226 may continuously or periodically generate and display updated report data to keep an administrator or other user apprised of the current progress of a lifecycle operation. Reporting logic 226 may also provide logic for searching and filtering the displayed report data. For example, reporting logic 226 may receive filter criteria and, in response, adjust the report data that is displayed.

Control console 228 provides a user interface that allows a user to monitor and administer, locally or from a remote network location, the lifecycle management processes described herein. The user interface may comprise, without limitation, a graphical user interface (GUI), an application programming interface (API), a command-line interface (CLI) or some other means of interacting with a user. A "user" in this context may include, without limitation, an application or a human user such as a system administrator.

Repository 230 comprises computer data storage that stores data for operation management services 220. For example, repository 230 may include, without limitation, a set of one or more disks, memories, storage appliances, storage servers, databases, and/or other non-transitory volatile or non-volatile storage mediums. Repository 230 stores data that is used by operation management services 220 including, without limitation, monitoring metadata 232, reporting metadata 234, event data 236, and report data 238.

Monitoring metadata 232 stores monitoring meta-models or other metadata that indicates what should be monitored during a lifecycle operation. In an embodiment, monitoring metadata 232 includes a plurality of signatures for a lifecycle operation, where each respective signature of the plurality of signatures is mapped to a status of a benchmark. The signatures may further be mapped to other attributes, which may include, without limitation, location data that specifies one or more file locations of log file(s) to be monitored for the respective signature, deployment identification data that identifies a deployment to which the signature applies, and/or lifecycle operation identification data that identifies an operation to which the signature applies.

Reporting metadata 234 stores reporting meta-models or other metadata that describes how to generate and display report data. For example, reporting metadata may define the monitoring benchmarks for which signature pattern matches are processed and reported. Reporting metadata may further define one or more reporting characteristics, which may include, without limitation, ordering data that specifies an order in which the benchmarks are processed for reporting purposes, and/or notification configuration data that specify conditions for reporting event alerts.

Event data 236 stores data that identifies target events within software deployments 212a to 212n. A "target event" in this context refers to occurrence of a signature pattern within a log file. The occurrence of the signature may be matched to a benchmark status (e.g., skipped, started, success, failure, not applicable), an event start time, and/or an event end time.

Report data 238 stores data indicating the progress of a lifecycle operation for one or more of software deployments 212a to 212n. For example, report data 238 may be used to display an ordered set of events from event data 236 in accordance with reporting metadata 234.

Lifcycle Operation Benchmarks

The development lifecycle of a software deployment may include, without limitation, the following stages: pre-deployment, deployment, and post-deployment. Each of these stages may entail one or more lifecycle operations. As an example, the pre-deployment phase may include operations for backing up data and provisioning software components. During the deployment and post-deployment phases, a software deployment may undergo various lifecycle operations such as upgrades, patches, and/or configuration changes.

A lifecycle operation may be associated with one or more sub-tasks, which are herein referred to as operation "benchmarks" or "milestones". For example, a provisioning operation may involve installation of various software components, where the installation of each separate software component represents a separate sub-task. Similarly, an upgrade operation may involve upgrading a plurality of software components, with the upgrade of each separate software component corresponding to a separate sub-task. The upgrade operation may further involve validation of one or more of the software components to determine whether they are functioning correctly. Lifecycle management system 200 may track and report on the progress of such benchmarks as described in further detail below.

In one embodiment, the plurality of signatures in the metadata are determined by automatically clustering and categorizing log files according to the techniques described in 62/056,073 that describes generating signatures. In a particular embodiment, the plurality of signatures in the metadata comprise an automatically or manually selected subset of the signatures produced according to the techniques from 62/056,073. The signatures may be automatically selected and mapped to corresponding status identifiers that represent corresponding benchmarks of particular operations. In one embodiment, the automatic selection and mapping is done using machine learning by applying results from a training set of manually classified log items or signatures to a larger set of log items to be automatically classified. The manually classified items or signatures are matched to corresponding signatures (or are the signatures themselves) from the set of automatically generated signatures according to the techniques of 62/056,073. Machine learning techniques, such as techniques that model data using support vector machine techniques or other classification techniques, or use decision trees or some other modeling data structure, are applied to the manually classified log items or signatures to learn which signatures typically represent which status identifiers. Log items matching those signatures are then automatically classified using the matched status identifiers. The mapping between log items and status identifiers can change over time as additional information becomes available about incorrect classifications and/or additional manual classifications.

Monitoring Metadata

As previously indicated, lifecycle management system 200 may maintain a set of monitoring metadata 232 to determine which benchmarks to track for a given lifecycle operation. In one embodiment, monitoring metadata 232 includes a set of one or more meta-models for monitoring, where a meta-model defines a set of signatures for various benchmarks of a particular lifecycle operation. A "signature" in this context may be a string value, a sequence of characters, or some other pattern that may be used to uniquely identify the status of a particular benchmark. For example, the signature may correspond to a unique pattern that is included in a log message upon occurrence of an event. A signature may include one or more wildcard characters to cover a range of string value that map to the same status.

An operation benchmark may be associated with one or more signatures, where each signature maps to a particular status. Examples of a benchmark status may include, without limitation, Skipped: A benchmark may be skipped and performed at a later time or not at all depending on the particular implementation;

Started: This status indicator may be used for benchmark sub-tasks that have started and are still pending;

Success: Signatures may map to this status to indicate the successful completion of a benchmark;

Failure: This status indicator may be used for benchmarks that could not be successfully completed; and/or Not Applicable. This status indicator may be used when a benchmark is not applicable for a particular lifecycle operation on a particular software deployment.

Monitoring metadata 232 may map a signature to location data that indicates which logs to monitor for occurrence of the signature. As an example, reporting metadata 234 may specify a filename and/or path for a log file or set of log files. The location data may include one or more wildcard characters to search a plurality of locations and log files for a signature.

Monitoring metadata 232 may further map a signature to a location of a start time and/or end time associated with the corresponding status. For example, reporting data may include data identifying the location of a timestamp that indicates the time that a benchmark was skipped, started, or completed. In one embodiment, the time information may be extracted from the log file that contains the signature.

Figure 3:
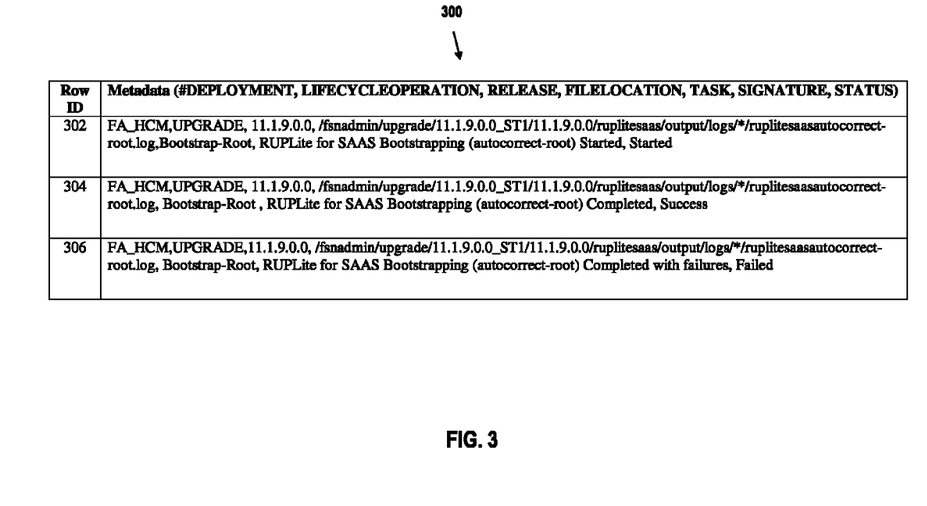
FIG. 3 illustrates example monitoring metadata that includes a plurality of signatures that are mapped to a set of attributes.

FIG. 3 illustrates example monitoring metadata that includes a plurality of signatures that are mapped to a set of attributes. Specifically, monitoring metadata 300 depicts three separate signatures for a particular benchmark of the upgrade operation. Each row of the metadata follows the format #DEPLOYMENT, LIFECYCLEOPERATION, RELEASE, FILELOCATION, TASK, SIGNATURE, STATUS, although different formats may be used depending on the particular implementation.

Row 302 includes the following metadata: "FA_HCM, UPGRADE,11.1.9.0.0,/fsnadmin/upgrade/11.1.9.0.0_ST1/ 11.1.9.0.0/ruplitesaas/output/logs/*/ruplitesaasautocorrect-root.log, Bootstrap-Root, RUPLite for SAAS Bootstrapping (autocorrect-root) Started, Started" where "FA_HCM" corresponds to the deployment type, "UPGRADE" corresponds to the lifecycle operation type, "11.1.9.0.0" corresponds to the release version of the deployment, ",/fsnadmin/upgrade/ 11.1.9.0.0_ST1/11.1.9.0.0/ruplitesaas/output/logs/*/ruplitesaasautocorrect-root.log,Bootstrap-Root" corresponds to the file location of the logs to monitor, "Bootstrap-Root" corresponds to the benchmark to which the signature applies, "RUPLite for SAAS Bootstrapping (autocorrect-root) Started" corresponds signature pattern, and "Started" corresponds to the status of the benchmark. The above metadata may be processed such that, during an upgrade of Fusion Apps HCM (FA_HCM) to "11.1.9.0.0" software, if the file "/fsnadmin/upgrade/11.1.9.0.0_ST1/11.1.9.0.0/ruplitesaas/ output/logs/*/ruplitesaasautocorrect-root.log" contains a pattern string "RUPLite for SAAS Bootstrapping (autocorrect-root) Started", the benchmark "Bootstrap-Root" is marked as "Started"

Rows 304 and 306 map different signatures to different statuses for the same benchmark. The metadata of row 304 may be processed such that during an upgrade of Fusion Apps HCM to "11.1.9.0.0" software, if the file "/fsnadmin/ upgrade/11.1.9.0.0_ST1/11.1.9.0.0/ruplitesaas/output/logs/ */ruplitesaasautocorrect-root.log" contains a pattern string "RUPLite for SAAS Bootstrapping (autocorrect-root) Completed", the benchmark "Bootstrap-Root" is marked as "Completed". Row 306 is similar, with the exception that if the same file includes the signature "RUPLite for SAAS Bootstrapping (autocorrect-root) Completed with failures", the task "Bootstrap-Root" is marked as "Failed".

Metadata 300 may include a plurality of other signatures that are not illustrated for the purpose of brevity. For example, an upgrade operation for an HCM system may include, without limitation, benchmarks such as upgrading one or more application tiers, performing backups, performing downtime checks, installing new components, and/or upgrading language packs. For each respective benchmark, metadata 300 may map a set of one or more signatures to a status of the respective benchmark. The metadata and signatures specified therein may vary by release version, deployment type, and/or lifecycle operation. As new versions of software are released, and benchmarks evolve over time, new meta-models may be added or the signatures of an existing meta-model may be updated.

Reporting Metadata

In one embodiment, lifecycle management system 200 maintains a set of reporting metadata 234 to determine how to report benchmark events for a lifecycle operation. The reporting metadata may comprise a set of one or more reporting meta-models. Each reporting meta-model may be associated with a different respective lifecycle operation and type of software deployment and may specify a set of one or more attributes for reporting benchmarks of the respective lifecycle operation and software deployment. Example attributes that may be specified by a reporting meta-model may include, without limitation, benchmark identification data that specifies which benchmarks to report, ordering information that indicates an order for reporting the benchmarks, and notification preferences for generating, sending, and/or displaying the report data.

Modelling logic 224 may provide an interface through which an administrator or other user may create reporting meta-models. For example, modelling logic 224 may provide, through a GUI or some other interface, a list of benchmark operations defined by a monitoring meta-model for a particular lifecycle operation. An administrator or other user may then provide input to select a subset of benchmarks for reporting the progress of the lifecycle operation. In response to the selection, modelling logic 224 may generate or update a reporting meta-model to include data that identifies the subset of benchmarks. Benchmarks that are not included in the selected subset are not included in the generated reports during runtime.

Modelling logic 224 may further provide an interface through which a user may control notification alerts. A notification alert in this context may be an email or some other message that notifies the user of the occurrence of an event. In one embodiment, the user may specify triggers for generating and sending a notification. As an example, the user may select to be notified upon the completion of a benchmark, but forego notifications when a benchmark has been started or skipped. In response, modelling logic 224 may store the notification preferences within reporting metadata 234, and, during runtime, reporting logic 226 may trigger notification based on the saved preferences. The reporting metadata thus allows the administrator to customize alert notifications to control the volume information that is reported during a lifecycle operation.

In one embodiment a reporting benchmark may be distinct from an operation benchmark. For one reporting benchmark, there may be one or more operation benchmarks. From each host, one or more log files may be scanned to determine the operation benchmarks. Once all the operation benchmarks are gathered, the reporting benchmarks are applied. For example, there may be a particular set of host machines, where each host in the set of hosts has a log message indicating the completion of a particular task. The log message from the different host machines gives the status of a different operation benchmark. Once the operation benchmarks are gathered, the start time and end time of a reporting benchmark may be computed, where the start time is the earliest start time of an operation benchmark from a plurality of operation benchmarks associated with the reporting benchmark, and the end time is the last time associated with a status among the plurality of benchmarks. The status (success/failure/skipped) associated with the reporting benchmark may be based on a plurality of operation benchmarks. If all operation benchmarks succeed, for example, then the reporting benchmark may be reported as a success. If one operation benchmark failed or skipped, then the reporting benchmark may also be reported as having failed or skipped even if other operation benchmarks of the plurality of operation benchmarks associated with the reporting benchmark have succeeded.

Runtime Monitoring by Agents

When a lifecycle operation is performed for one of software deployments 212a to 212n, the corresponding agent monitors for the occurrence of target signatures within operation log data. A "target signature" in this context is a signature that is included in an associated monitoring meta-model. As an example, if software deployment 212a is an instance of Fusion Apps HCM software and has been upgraded to a release version of "11.1.9.0.0", then agent 214a may monitor log messages at the location "/fsnadmin/upgrade/11.1.9.0.0_ST1/11.1.9.0.0/ruplitesaas/output/logs/*/ruplitesaasautocorrect-root.log" for the signatures specified in rows 302 to 306 of FIG. 3. The agent may report signature matches, if any, to operation management services 220.

Figure 4:
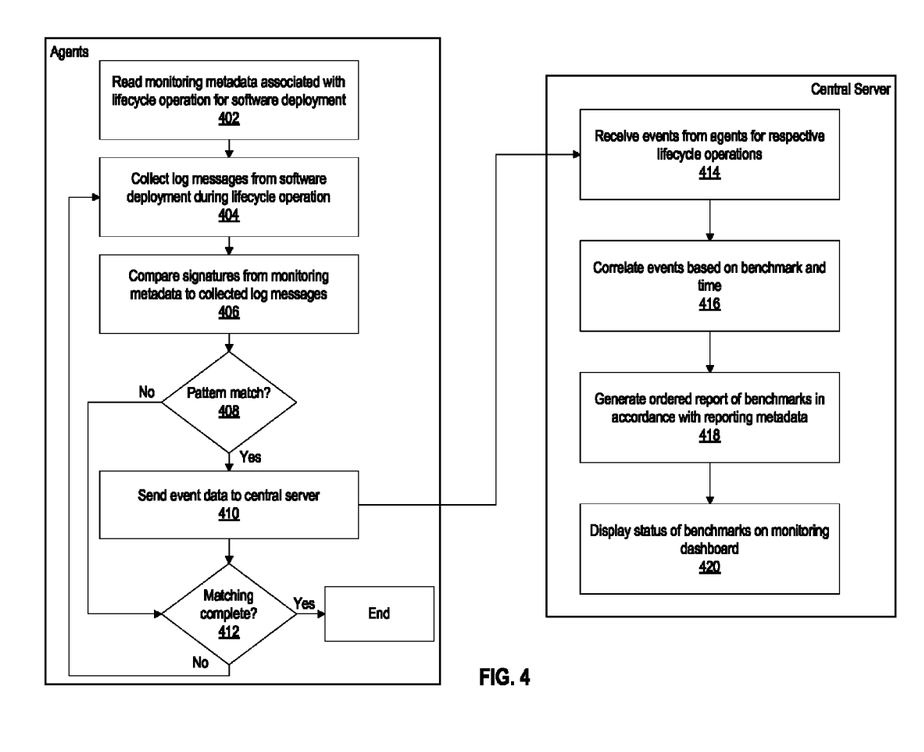
FIG. 4 illustrates an example runtime process for tracking and displaying benchmark events.

FIG. 4 illustrates an example runtime process for tracking and displaying benchmark events. At step 402, the agent reads monitoring metadata associated with the lifecycle operation being performed for the software deployment. As an example, this step may comprise identifying an applicable monitoring meta-model based on the particular type of lifecycle operation being performed and the particular type of software to which the lifecycle operation is being applied. The meta-model may be stored in storage that is on the same host and local to the agent, or the meta-model may be stored in shared storage that is accessible to each of agents 214a to 214n. Once identified, the agent may then instantiate the meta-model.

At step 404, the agent collects log messages from the software deployment during the lifecycle operation. In order to collect log messages, the agent may identify the file location of the log files from the instantiated meta-model. The agent may then search these locations for log messages. The agent may collect the log message on a periodic or continuous basis, depending on the particular implementation.

At step 406, the agent compares signatures from monitoring metadata to the collected log messages. For example, the agent may iterate through a set of signatures included in the instantiated monitoring meta-model and compare each respective signature to the collected log messages to determine if any of the log messages includes a string value or other pattern that matches the respective signature.

At step 408, the agent determines, based on the comparison, whether a target signature matches any patterns within the log messages. If a match is found, then the process continues to step 410, and the agent sends event data to the central server for each signature that was matched. Otherwise, the process skips to step 412, and the agent determines that there are no matches for the signature.

At step 412, the agent determines whether the pattern matching for the operational/monitoring benchmarks defined in the monitoring metadata are complete. If not, then the process returns to step 404 and continues monitoring log messages for the occurrence of signatures. The agent may then update the status information for a benchmark is a signature is subsequently detected in a log file. Once the pattern matching for all monitoring benchmarks is complete at step 412, the reporting benchmark updates may also be completed, and the monitoring process with respect to the particular software deployment may end.

Monitoring Benchmarks Across Different Software Deployments

The monitoring process described above may be concurrently applied to a plurality of different software deployments. As an example, agent 214a may monitor a first lifecycle operation performed for software deployment 212a while agent 214n monitors a second lifecycle operation for software deployment 212n. Each of the agents may thus independently report benchmark events to operation management services 220.

The monitoring meta-model instantiated by each active agent may vary based on the type of software deployment that is being monitored and the type of lifecycle operation being performed. For instance, if agent 214a is monitoring the upgrade of a first type of deployment (e.g., a CRM), agent 214a may instantiate a first meta-model that includes a first set of signatures. Agent 214a may then monitor log data 216a for the first set of signatures during the upgrade operation. During this time, agent 214n may concurrently monitor the upgrade of a second type of deployment (e.g., an ERP), which may involve instantiating a second meta-model that includes a different set of signatures than the first meta-model. Agent 214n monitors log data 216n for the second set of signatures included in the second meta-model.

This process may continue for other agents as well, with each agent independently monitoring a different lifecycle operation on different software instances.

Centralized Reporting

In one embodiment, operation management services 220 acts as a central servicer for agents 214a to 214n. As each agent independently processes log messages during a lifecycle operation, event data is sent to operation management services 220. Report logic 226 may process the event data to generate a centralized report that indicates the progress of each of the lifecycle operations being performed on software deployments 212a to 212n.

Steps 414 to 420 of FIG. 4 depict an example process for generating a centralized report, according to an embodiment. At step 414, the central server receives event data from the agents for the respective lifecycle operations being monitored. The event data that is received may indicate the occurrence of a pattern matched to a task status and its start or end time.

At step 416, the central server correlates events based on benchmark and time. For example, the central server may build a first index that sorts the events according to benchmark and another index that sorts the events based on start or end time. As previously indicated, different signatures may be correlated to the same event. For example, a different signature may be used for different respective statuses of an event. Across different types of deployments, different signatures may be used for the same benchmark status. Thus, a first signature may be used to indicate success of a benchmark for a first type of deployment while a different signature may be used to indicate success for the same benchmark for a different type of deployment.

At step 418, the central server generates an ordered report of benchmarks in accordance with the reporting metadata. The status of benchmarks that are not specified in the reporting metadata may be omitted in the report. The central server may determine the status of the benchmarks for reporting based on the event correlations described above.

At step 420, the central server displays the status of the benchmarks on a monitoring dashboard. In one embodiment, each software deployment that is being monitored is displayed as a separate row in a monitoring dashboard. The status of various benchmarks may be displayed as column values for each software deployment. The central server may allow the administrator to look at each of the deployment's lifecycle operation, the start and end times, the progress of each stage, and any failures from a single dashboard.

Figure 5:
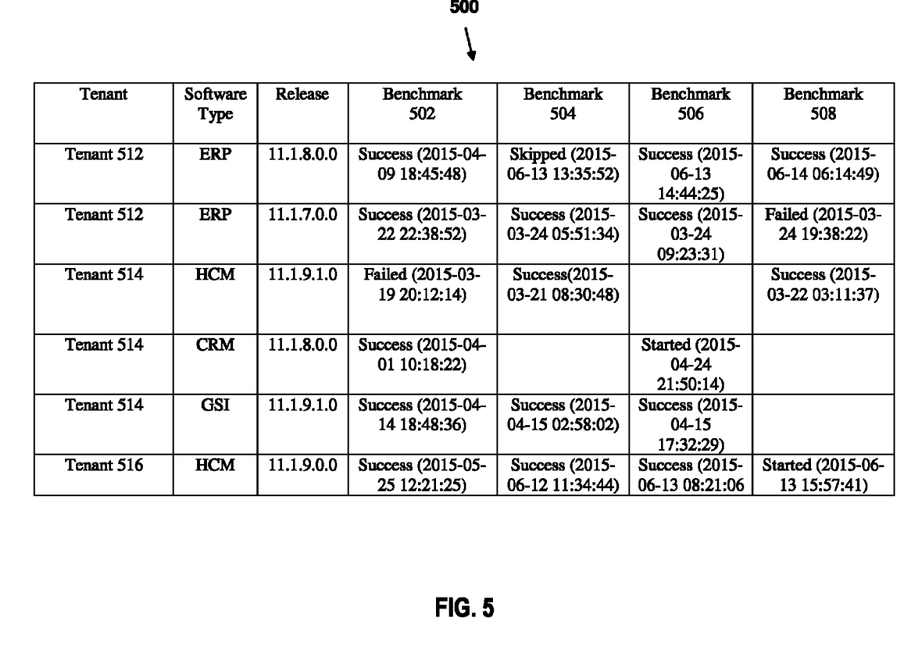
FIG. 5 illustrates example report data that may be presented to indicate the progress of lifecycle operations across various service instances.

FIG. 5 illustrates example report data that may be presented to indicate the progress of lifecycle operations across various service instances. Each row of report data 500 corresponds to a different service instance and depicts a tenant associated with the service instance, the type of software and release version of the service instance, and the status of benchmarks 502, 504, 506, and 508. A "tenant" in this context is a user or group of users that are served by a service instance. In some scenarios, a tenant may be associated with multiple service instances. For example, tenant 512 is associated with two different service instances, and tenant 514 is associated with three different service instances.

A benchmark may span across different release versions and different types of software deployments. The status of benchmark 502, for example, is reported for ERP, HCM, CRM, and GSI deployments. The status indicates the date and time and outcome of the particular benchmark. In some cases, a benchmark may not be applicable to a particular service instance. For example, the status of benchmark 504 and benchmark 508 are left blank for the CRM deployment with a release version of 11.1.8.0.0 as they are not applicable to this service instance.

Filtering Report Data

In one embodiment, reporting logic 226 allows the user to refine the report data that is displayed in real time. To refine the report, the user may input a set of one or more filter criteria for organizing the report data. Example filter criteria may include, without limitation:

Time-base filters: An administrator may specify a window of time to organize and present report data. Reporting logic 226 may adjust the report data such that only the service instances which went through life cycle operations during the selected window are displayed.

Lifecycle-based filters: An administrator may filter report data based on a set of one or more lifecycle operations and/or a set of one or more benchmarks. Reporting logic 226 may adjust the report data such that only selected lifecycle operations and/or benchmarks are displayed.

Instance-based filters: An administrator may specify a filter based on service instance properties, such as by tenant, software type, and/or release version. Reporting logic 226 may filter out instances that do not satisfy the filter criteria.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
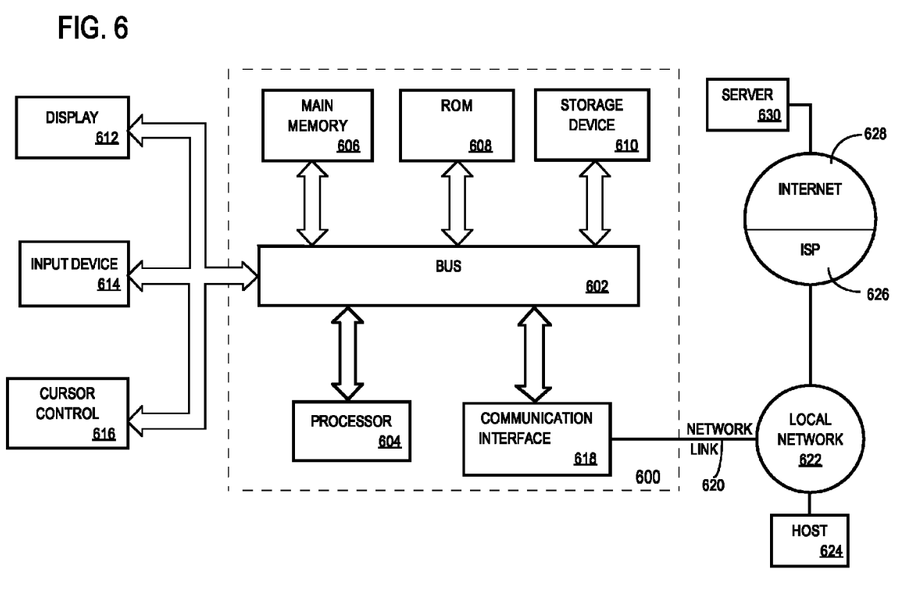
FIG. 6 is a block diagram that illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a liquid-crystal display (LCD) or a light-emitting diode (LED) display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Cloud Computing Overview

The techniques described herein are implemented using one or more processing solutions, examples of which include distributed systems, clustered computing systems, and cloud computing systems. In an embodiment, operation management services 220 are part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to system 200, or to other entities within this description, is controllable via an interface that is exposed at a cloud computing system.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

storing, in volatile or non-volatile storage, metadata that includes a plurality of signatures, the metadata mapping a first signature of the plurality of signatures to a first status identifier for a first benchmark of a particular operation, and a second signature of the plurality of signatures to a second status identifier for a second benchmark of the particular operation;

monitoring, during execution of the particular operation on a first set of one or more software deployments, a first set of log data associated with the first set of one or more software deployments for occurrence of the first signature and for occurrence of the second signature;

based, at least in part, on monitoring the first set of log data associated with the first set of one or more software deployments for occurrence of the first signature and for occurrence of the second signature, determining, during execution of the particular operation on the first set of one or more software deployments, a status of the first benchmark and a status of the second benchmark of the particular operation with respect to the first set of one or more software deployments;

generating and causing display of report data that indicates the status of the first benchmark and the status of the second benchmark of the particular operation with respect to the first set of one or more software deployments.

2. The method of claim 1, wherein the plurality of signatures further includes a third signature that maps to the first status identifier for the first benchmark of the particular operation;

wherein the first set of one or more software deployments are instances of a first type of software;

the method further comprising:

monitoring, during execution of the particular operation on a second set of one or more software deployment that are instances of a second type of software, a second set of log data associated with the second set of one or more software deployments for occurrence of the third signature;

based, at least in part, on monitoring the second set of log data associated with the second set of one or more software deployments for occurrence of the third signature, determining the status of the first benchmark of the particular operation with respect to the second set of one or more software deployments; and wherein the report data that indicates the status of the first benchmark of the particular operation with respect to the first set of one or more software deployments further indicates the status of the first benchmark with respect to the second set of one or more software deployments.

3. The method of claim 1, wherein the plurality of signatures includes a third signature that maps to a second status identifier for the first benchmark of the particular operation;

the method further comprising monitoring the first set of log data associated with the first set of one or more software deployments for occurrence of the third signature; and wherein determining the status of the first benchmark of the particular operation with respect to the first set of one or more software deployments is further based on monitoring the first set of log data associated with the first set of one or more software deployments for occurrence of the third signature.

4. The method of claim 1, wherein the metadata further maps the first signature to location identification data that identifies where to locate the first set of log data.

5. The method of claim 1, further comprising:

receiving input that identifies a first subset of benchmarks associated with the particular operation;

in response to the input, storing a set of reporting metadata that identifies the first subset of benchmarks associated with the particular operation; and wherein the report data that is displayed includes the first subset of benchmarks that is identified by the set of report metadata and does not include a second subset of benchmarks that is not identified by the set of report metadata.

6. The method of claim 5, wherein the report metadata further identifies an order for displaying the first subset of benchmarks; and wherein the report data displays the first subset of benchmarks according to the order identified by the report metadata.

7. The method of claim 5, wherein the report data displays the first subset of benchmarks in an order that is determined by completion time.

8. The method of claim 1, wherein the first set of one or more software deployments are instances of a first type of software;

wherein the report data that is displayed indicates the status of the first benchmark for the first set of one or more software deployments and a second set of one or more software deployments that are instances of a second type of software;

wherein the report data that is displayed further indicates a status of a second benchmark for the first set of one or more software deployments; and wherein the report data that is displayed does not indicate the status of the second benchmark for the second set of one or more software deployments.

9. The method of claim 1, further comprising:

receiving filter criteria to filter which software deployments of a plurality of software deployments are displayed in the report data; and wherein the filter criteria specifies a constraint based, at least in part, on the status of the first benchmark of the particular operation.

10. One or more non-transitory computer-readable media storing instructions which, when executed by one or more processors, cause operations comprising:

storing, in volatile or non-volatile storage, metadata that includes a plurality of signatures, the metadata mapping a first signature of the plurality of signatures to a first status identifier for a first benchmark of a particular operation, and a second signature of the plurality of signatures to a second status identifier for a second benchmark of the particular operation;

monitoring, during execution of the particular operation on a first set of one or more software deployments, a first set of log data associated with the first set of one or more software deployments for occurrence of the first signature and for occurrence of the second signature;

based, at least in part, on monitoring the first set of log data associated with the first set of one or more software deployments for occurrence of the first signature and for occurrence of the second signature, determining, during execution of the particular operation on the first set of one or more software deployments, a status of the first benchmark and a status of the second benchmark of the particular operation with respect to the first set of one or more software deployments;

generating and causing display of report data that indicates the status of the first benchmark and the status of the second benchmark of the particular operation with respect to the first set of one or more software deployments.

11. The one or more non-transitory computer-readable media of claim 10,
wherein the plurality of signatures further includes a third signature that maps to the first status identifier for the first benchmark of the particular operation;
wherein the first set of one or more software deployments are instances of a first type of software;
the instructions further causing operations comprising:
monitoring, during execution of the particular operation on a second set of one or more software deployment that are instances of a second type of software, a second set of log data associated with the second set of one or more software deployments for occurrence of the third signature;
based, at least in part, on monitoring the second set of log data associated with the second set of one or more software deployments for occurrence of the third signature, determining, during execution of the particular operation on the first set of one or more software deployments, the status of the first benchmark of the particular operation with respect to the second set of one or more software deployments; and
wherein the report data that indicates the status of the first benchmark of the particular operation with respect to the first set of one or more software deployments further indicates the status of the first benchmark with respect to the second set of one or more software deployments.

12. The one or more non-transitory computer-readable media of claim 10,
wherein the plurality of signatures includes a third signature that maps to a second status identifier for the first benchmark of the particular operation;
the method further comprising monitoring the first set of log data associated with the first set of one or more software deployments for occurrence of the third signature; and
wherein determining the status of the first benchmark of the particular operation with respect to the first set of one or more software deployments is further based on monitoring the first set of log data associated with the first set of one or more software deployments for occurrence of the third signature.

13. The one or more non-transitory computer-readable media of claim 10, wherein the metadata further maps the first signature to location identification data that identifies where to locate the first set of log data.

14. The one or more non-transitory computer-readable media of claim 10, further storing
instructions causing operations comprising:
receiving input that identifies a first subset of benchmarks associated with the particular operation;
in response to the input, storing a set of report metadata that identifies the first subset of benchmarks associated with the particular operation; and
wherein the report data that is displayed includes the first subset of benchmarks that is identified by the set of report metadata and does not include a second subset of benchmarks that is not identified by the set of report metadata.

15. The one or more non-transitory computer-readable media of claim 14,
wherein the report metadata further identifies an order for displaying the first subset of benchmarks; and
wherein the report data displays the first subset of benchmarks according to the order identified by the report metadata.

16. The one or more non-transitory computer-readable media of claim 14, wherein the report data displays the first subset of benchmarks in an order that is determined by completion time.

17. The one or more non-transitory computer-readable media of claim 10,
wherein the first set of one or more software deployments are instances of a first type of software;
wherein the report data that is displayed indicates the status of the first benchmark for the first set of one or more software deployments and a second set of one or more software deployments that are instances of a second type of software;
wherein the report data that is displayed further indicates a status of a second benchmark for the first set of one or more software deployments; and
wherein the report data that is displayed does not indicate the status of the second benchmark for the second set of one or more software deployments.

18. The one or more non-transitory computer-readable media of claim 10, further storing
instructions that cause operations comprising:
receiving filter criteria to filter which software deployments of a plurality of software deployments are displayed in the report data; and
wherein the filter criteria specifies a constraint based, at least in part, on the status of the first benchmark of the particular operation.

* * * * *

UNITED STATES PATENT AND TRADEMARK OFFICE
CERTIFICATE OF CORRECTION

| | | |
|---|---|---|
| PATENT NO. | : 9,626,271 B2 | Page 1 of 1 |
| APPLICATION NO. | : 14/725442 | |
| DATED | : April 18, 2017 | |
| INVENTOR(S) | : Karpuram et al. | |

It is certified that error appears in the above-identified patent and that said Letters Patent is hereby corrected as shown below:

In the Specification

In Column 6, Line 26, delete "Lifcycle" and insert -- Lifecycle --, therefor.

In Column 7, Line 40, delete "Applicable." and insert -- Applicable: --, therefor.

In Column 8, Line 20, after ""Started"" insert -- . --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*